Sept. 8, 1942.  J. A. CASSELL  2,294,962
CENTERING DEVICE FOR OVEN BANDS
Filed July 7, 1939
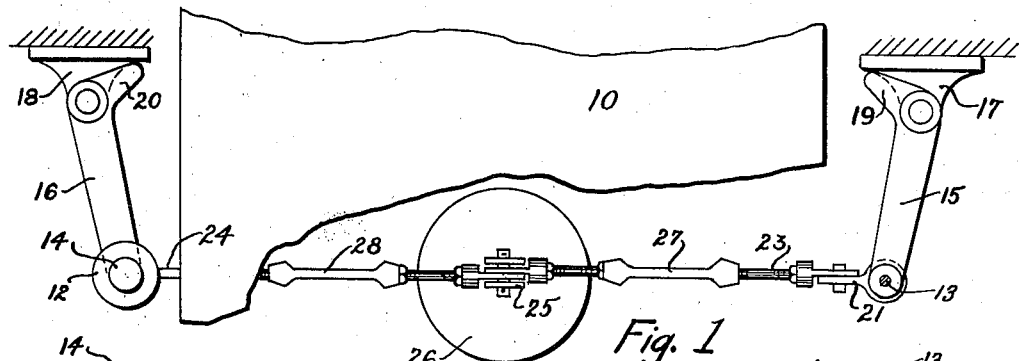
Fig. 1
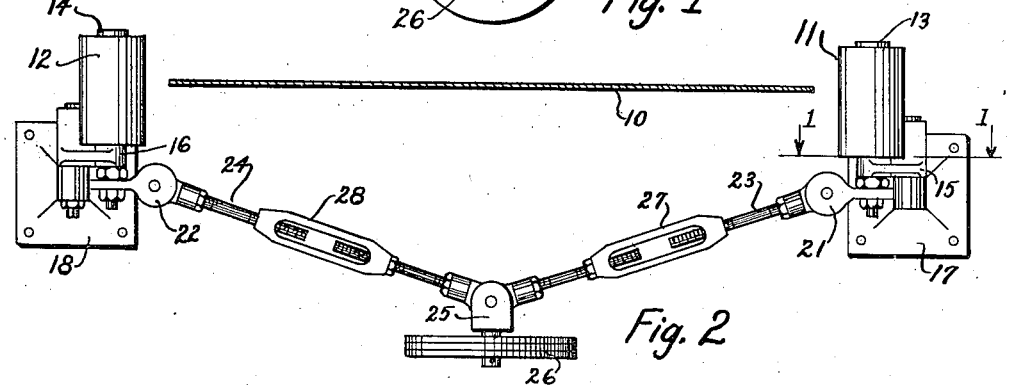
Fig. 2
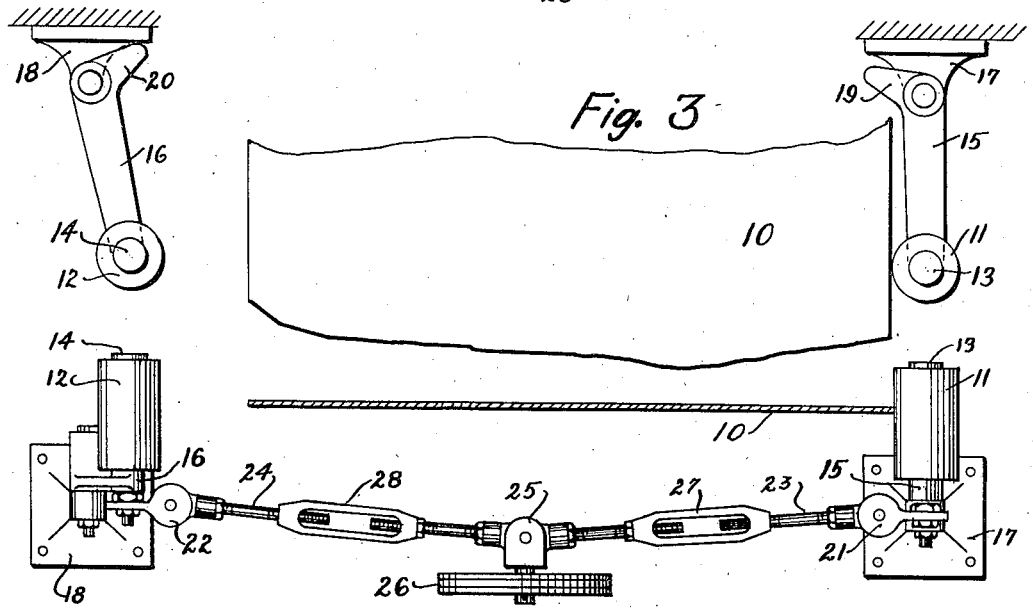
Fig. 3
Fig. 4
INVENTOR.
JOHN ALLAN CASSELL
BY Henry J Savage
ATTORNEY Patented Sept. 8, 1942

2,294,962

UNITED STATES PATENT OFFICE 2,294,962

CENTERING DEVICE FOR OVEN BANDS

John Allan Cassell, Brooklyn, N. Y., assignor to National Biscuit Company, New York, N. Y., a corporation of New Jersey Application July 7, 1939, Serial No. 283,158

6 Claims. (Cl. 198—202)

My invention is a centering device for oven bands although in its broadest aspects it is applicable to endless belts, bands and conveyors of many kinds.

Oven bands have come into quite extensive use in the baking industry in recent years and to a large extent have replaced the endless chain and reel types of ovens. As the name implies, an oven band consists essentially of an endless metal band or belt that passes over drums, one or both of which may be driven, at the two ends of the oven. These drums may be 250 to 300 feet apart so that the steel band is from 500 to 600 feet long, and from two to six feet wide. This band is driven continuously at uniform speed and its upper run is heated to varying temperatures on its passage through the oven, which usually is divided or separated by partitions or baffles into several zones or sections in which different degrees of temperature, humidity and baking conditions are maintained. The dough biscuits, cake, crackers or other material to be baked or treated are supplied continuously to the upper run of the band as it enters the oven at one end and are delivered at the other end of the oven fully baked or otherwise treated.

Because of the great length of the band, its unequal expansion in the several baking zones, the impossibility of keeping the temperatures and tension absolutely uniform across the belt at any point, and many other factors difficult to analyze or overcome, the band is constantly "hunting" or shifting from side to side on the drums and in the oven. If this creeping is not too great or does not accumulate in one direction, no harm is done, but since there is only a small clearance between the edges of the band and the side standards supporting the oven, and the materials to be baked must be deposited as nearly as possible equally spaced with respect to both edges of the band in order to insure uniform baking, the band cannot be permitted to shift far in either direction, usually only a fraction of an inch. If it shifts too far, either the baked goods will be inferior in quality, the band will be ruined or the oven frame greatly damaged.

The principal object of the present invention therefore is to provide means that will keep the band correctly centered in the oven and prevent its shifting laterally on the drums or in the oven far enough to cause damage either to the band or any part of the oven that might be struck or cut by the edge of the band. Another object is to return the band to center or normal position if it should creep or run to one side.

I accomplish these objects by means of the present invention, of which I have illustrated one embodiment in the accompanying drawing wherein:

Fig. 1 is a plan view showing a part of the band broken away and the guide roller on the right being omitted as indicated at the section line 1—1 on Fig. 2.

Fig. 2 is a side elevation, the band being in central or normal position.

Fig. 3 is a plan view, the band having crept to the right, and the toggle links and weight being omitted.

Fig. 4 is a side elevation of Fig. 3 but showing the toggle links and weight in raised position.

10 indicates a part of an endless steel band which passes around drums at opposite ends of the oven either or both of which drums may be driven continuously. At one or more suitable points along either the upper or lower run of the band I mount rollers 11, 12 adjacent to but normally spaced from the opposite edges of the band. These rollers may be made of hardened steel, chilled iron, or other suitable material and are rotatably mounted on spindles 13, 14 which are secured to the outer ends of swinging arms 15, 16. These arms are pivoted at their other ends to brackets 17, 18 fixed to the frame of the machine. The pivoted end of each arm has a lug or heel 19, 20 adapted to abut the fixed brackets 17, 18 and limit the inward swinging movement of the arms. The spindles 13, 14 preferably extend through the outer ends of the arms and provide connections for the eyes 21, 22 to which the outer ends of the toggle links 23, 24 are pivotally connected. The inner ends of the toggles are connected together by a yoke 25 which supports a weight 26, that may be made in several sections so that the force exerted against the band may be varied by changing the number of sections.

Preferably each of the toggle links is provided with an adjusting means such as the turnbuckles 27, 28 so that their lengths can be adjusted to suit varying widths of the band 10 and also so that the angle at which the toggle links meet can be varied to change the pull exerted by the weight 26 on the arms 15, 16 and limit the travel of the arms. The length of sections of the links 23, 24 can be changed to accommodate large variations in band width. The adjustable weight 26 and turnbuckles 27, 28, provide means whereby the force resisting displacement of either roller 11 or 12 or the force acting to return the band may be varied in magnitude for any given displacement of one of the rollers.

Figs. 1 and 2 show the band in its central or normal position when it is running properly on the drums. As thus shown, the band is not in contact with either of the thrust members 11 and 12. Figs. 3 and 4 show the operation of the device when the band 10 has crept to one side (to the right in these figures). As shown, the lug 20 remains in contact with the abutment 18 and has not moved from the position which it occupies in Fig. 1. The band is in contact with the roller 11 and has forced the arm 15 to the right straightening the toggle links 23, 24 and raising the weight 26 until it exerts sufficient pull on the arm 15 and roller 11 to force the band 10 back toward its normal position. Similarly if the band creeps to the left the roller 12 will force it back to central position.

This centering mechanism may be located at any desired point along either the upper or lower run of the band and when the bands are very long as where the ovens are 200 to 300 feet in length, more than one may be used.

While I have shown the band 10 as a continuous steel band, my invention contemplates the use of other bands, as open mesh bands, and other types of conveyors that are suitable for the purpose. It will therefore be understood that when I use the term "band," it includes not only the continuous steel band but all equivalent forms or types of bands.

Having thus described one form of my invention and its adaptation to oven bands, I claim all modifications and forms thereof that may come within the scope of my claims.

What I claim is:

1. In a device of the class described, the combination of an endless band, a thrust roller movably mounted adjacent each edge of the band in position to be engaged by the edge of the band when it shifts laterally, means preventing movement of the rollers inward toward the band but permitting movement outward from the band, toggle links connected at their outer ends to said roller mounting means and connected together at their inner ends beneath the band, and a weight supported by the connected ends of the toggle links.

2. In a device of the class described, the combination of an endless band, a swinging arm mounted adjacent each edge of the band, a thrust member on each arm adjacent the band and out of contact with the band when the latter is in its normal position, a pair of toggle links connected at their outer ends to said arms and at their inner ends connected together beneath the band, a weight supported by the inner ends of said toggle links, and abutments limiting the swinging movement of said arms toward the band.

3. In a band centering device, the combination of fixed supports spaced apart, an arm pivoted adjacent one end to each support and having a heel adapted to abut its support and limit movement of the arms toward each other, a thrust member mounted on the free end of each arm, a toggle link connected at one end to each arm adjacent its free end, the other ends of the links being connected together, and a weight supported by the connected ends of the toggle links.

4. In a band centering device, the combination of fixed supports, arm pivoted adjacent one end to each support, abutments limiting swinging movement of said arms toward each other, a thrust roller mounted on the free end of each arm, a toggle link connected at one end to each of said arms, the other ends of said links being connected together, a weight supported by the connected ends of said links, and means for adjusting the angle between said connected links whereby the force exerted on said arms by said weight may be varied.

5. In a device of the class described, the combination of an endless band, a thrust roller adjacent the edge of the band in position to be engaged by the edge of the band when the band shifts toward the roller from its normal position, a mounting for the roller permitting it to move toward and from the band, a stop limiting movement of the roller toward the band, a toggle link comprising two links connected together at an angle at their inner ends beneath the band, the outer end of one link being connected with said roller mounting, the outer end of the other link being supported adjacent the opposite side of the band, a weight supported at the connected ends of the links, whereby as the roller is moved outward by the band the angle between the links will increase and the pull of the weight on the roller mounting will be progressively increased.

6. In a device of the class described, the combination of an endless band, a thrust roller adjacent the edge of the band in position to be engaged by the edge of the band when the band shifts toward the roller from its normal position, a mounting for the roller permitting it to move toward and from the band, a stop limiting movement of the roller toward the band, a toggle link comprising two links connected together at an angle at their inner ends beneath the band, the outer end of one link being connected with said roller mounting, the outer end of the other link being supported adjacent the opposite side of the band, and means exerting a lateral pull on the connected ends of the links, whereby as the roller is moved outward by the band the angle between the links will increase and the pull of the links on the roller mounting will be progressively increased.

JOHN ALLAN CASSELL.